United States Patent
Kim et al.

(10) Patent No.: US 12,257,892 B2
(45) Date of Patent: Mar. 25, 2025

(54) TRANSMISSION MOUNT FOR VEHICLE

(71) Applicants: HYUNDAI MOTOR COMPANY, Seoul (KR); KIA CORPORATION, Seoul (KR)

(72) Inventors: Jang Ho Kim, Yongin-si (KR); Ki Woong Jeong, Gwacheon-si (KR); Se Hwan Jun, Busan (KR); Dong Hyun Lee, Hwaseong-si (KR); Jun Haeng Heo, Seoul (KR); Jong Young Hwang, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 382 days.

(21) Appl. No.: 17/688,162

(22) Filed: Mar. 7, 2022

(65) Prior Publication Data
US 2023/0016680 A1    Jan. 19, 2023

(30) Foreign Application Priority Data
Jul. 12, 2021    (KR) .................. 10-2021-0090672

(51) Int. Cl.
*B60K 17/00* (2006.01)
*F16F 1/54* (2006.01)
*F16F 15/08* (2006.01)

(52) U.S. Cl.
CPC .............. *B60K 17/00* (2013.01); *F16F 1/54* (2013.01); *F16F 15/08* (2013.01)

(58) Field of Classification Search
CPC .... F16F 15/08; F16F 1/54; B60K 5/12; B60K 5/1208; B60K 17/00; B60K 17/06; B60K 5/1291; B60Y 2306/09; B62D 21/11
(Continued)

(56) References Cited

U.S. PATENT DOCUMENTS 2,973,951 A * 3/1961 Billing .................. B60G 11/42
267/269
4,203,499 A * 5/1980 Miyata ............... B62D 33/0604
180/312
(Continued)

FOREIGN PATENT DOCUMENTS

JP    2010-084791 A    4/2010
JP    2018-179013 A    11/2018
(Continued)

*Primary Examiner* — Bradley T King
*Assistant Examiner* — James K Hsiao
(74) *Attorney, Agent, or Firm* — Morgan, Lewis & Bockius LLP

(57) ABSTRACT

Proposed is a transmission mount for a vehicle in which the structure of an upper insert and a lower insert integrated with a single bridge among components of the transmission mount is improved to reduce the static stiffness in the right-left direction (i.e., the Y direction) of the transmission mount. The strength of the transmission mount in the front-rear direction (i.e., the X direction) and the static stiffness in the top-bottom direction (i.e., the Z direction) is reinforced so that the pitching motion and the vertical bounce behavior of the transmission may be efficiently controlled. Accordingly, booming noise caused by the rolling motion of the transmission is minimized, thereby improving NVH performance and meeting driving performance.

20 Claims, 10 Drawing Sheets

(58) Field of Classification Search
USPC .......................................................... 267/292
See application file for complete search history.

(56) References Cited

U.S. PATENT DOCUMENTS

| | | | | |
|---|---|---|---|---|
| 4,987,679 | A * | 1/1991 | Rau ........................... | F16F 1/52 |
| | | | | 267/153 |
| 5,460,238 | A * | 10/1995 | Burke .................. | B60K 5/1216 |
| | | | | 267/293 |
| 5,799,930 | A * | 9/1998 | Willett .................... | F16F 3/093 |
| | | | | 267/141.5 |
| 6,000,672 | A * | 12/1999 | Bunker .................. | F16F 1/377 |
| | | | | 248/634 |
| 6,959,922 | B2 * | 11/2005 | Miyahara ................. | B60K 5/04 |
| | | | | 248/605 |
| 7,077,389 | B2 | 7/2006 | Kries et al. | |
| 7,207,553 | B2 * | 4/2007 | Arakawa .................. | F16F 1/54 |
| | | | | 267/140.13 |
| 10,611,228 | B2 * | 4/2020 | Murakami ........... | B60K 5/1208 |
| 11,209,032 | B2 * | 12/2021 | Brewer ..................... | F16B 5/01 |
| 11,971,078 | B2 * | 4/2024 | Carels ..................... | E04H 9/022 |
| 2002/0163113 | A1 * | 11/2002 | Seynaeve ................ | F16F 7/00 |
| | | | | 267/140.13 |
| 2005/0178943 | A1 * | 8/2005 | Tsutsumida ............... | F16F 1/54 |
| | | | | 248/560 |
| 2006/0022390 | A1 * | 2/2006 | Arakawa ................... | F16F 1/54 |
| | | | | 267/140.11 |
| 2006/0202099 | A1 * | 9/2006 | Stribling ................ | B60K 17/00 |
| | | | | 248/544 |
| 2007/0262503 | A1 * | 11/2007 | Rogge ................... | F16F 1/3863 |
| | | | | 267/293 |
| 2009/0095558 | A1 * | 4/2009 | Bigg ...................... | B60K 17/00 |
| | | | | 180/312 |
| 2015/0240901 | A1 * | 8/2015 | Ishikawa ............... | F16F 1/3863 |
| | | | | 248/634 |
| 2017/0023172 | A1 * | 1/2017 | Coldwell ............. | B60K 5/1283 |
| 2018/0017124 | A1 * | 1/2018 | Quaggiotto ............ | F16F 1/377 |
| 2020/0325921 | A1 * | 10/2020 | Brewer ................. | F16B 5/0241 |
| 2021/0239181 | A1 * | 8/2021 | Martinez ................ | F16F 15/04 |
| 2022/0105792 | A1 * | 4/2022 | Choi ..................... | B60K 17/00 |

FOREIGN PATENT DOCUMENTS

| | | |
|---|---|---|
| KR | 20-1998-0049687 A | 10/1998 |
| KR | 10-0764752 B1 | 10/2007 |
| KR | 10-2008-0006900 A | 1/2008 |
| KR | 10-1952434 B1 | 2/2019 |
| WO | 2006/012217 A2 | 2/2006 |

* cited by examiner

[ B-B Cross-Section ]   [ A-A Cross-Section ]

TRANSMISSION MOUNT FOR VEHICLE

CROSS REFERENCE TO RELATED APPLICATION

The present application claims priority to Korean Patent Application No. 10-2021-0090672, filed Jul. 12, 2021, the entire contents of which are incorporated herein for all purposes by this reference.

TECHNICAL FIELD

The present disclosure relates generally to a transmission mount for a vehicle and, more particularly, to a transmission mount for a vehicle having an improved structure configured to reduce booming, thereby improving noise, vibration, and harshness (NVH) performance, and meeting driving performance.

BACKGROUND

In general, a powertrain including an engine and a transmission of a rear-wheel drive (RWD) vehicle is supported by a plurality of mounts arranged in the longitudinal direction of the vehicle and disposed around the center of gravity of the powertrain.

The mount may be categorized into an engine mount supporting the engine of the powertrain and a transmission mount supporting the transmission or a transfer.

In general, when the vehicle is a two-wheel drive (2WD) vehicle, the transmission mount is mounted on the transmission. When the vehicle is an all-wheel drive (AWD) vehicle referring to a four-wheel drive (4WD) vehicle, the transmission mount is mounted on the transfer.

For reference, the transfer refers to an auxiliary transmission for a 4WD vehicle, and is disposed on the rear portion of the transmission to serve to distribute power to the front and rear wheels.

The transmission mount includes a cross member connected to a vehicle body and an insulator mounted on the cross member and supporting the transmission or the transfer. Although the insulator may be implemented by a rubber mount type or a hydro mount type, in most cases, a rubber mount type is used for the insulator.

In addition, noise, vibration, and harshness (NVH) of the vehicle and the driving performance of the vehicle have a trade-off relationship in some aspects. For example, the higher the dynamic stiffness of the transmission mount, the more the drive performance (regarding, for example, ride shaking or aftershock feeling) of the vehicle may be advantageously improved. However, as a tradeoff, the NVH performance of the vehicle may be deteriorated.

In particular, differently from a 2WD vehicle in which the rolling motion of the transmission generally occurs, in an AWD vehicle in which the pitching motion of the transmission occurs in addition to the rolling motion, the transmission mount may be further compressed. Thus, the static stiffness of the transmission mount in the right-left direction (i.e., the Y direction) may be increased, thereby deteriorating booming noise or the like caused by the rolling motion of the transmission.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a transmission mount for a vehicle in which the structure of an upper insert and a lower insert integrated with a single bridge among components of the transmission mount may be improved to reduce the static stiffness in the right-left direction (i.e., the Y direction) of the transmission mount. The strength of the transmission mount in the front-rear direction (i.e., the X direction) and the static stiffness in the top-bottom direction (i.e., the Z direction) may be reinforced so that the pitching motion and the vertical bounce behavior of the transmission may be efficiently controlled. Accordingly, it is possible to minimize booming noise caused by the rolling motion of the transmission, thereby improving noise, vibration, and harshness (NVH) performance, and thus, meeting driving performance.

In order to achieve at least one of the above objectives, according to one aspect of the present disclosure, there is provided a transmission mount for a vehicle. The transmission mount may include an insulator including: an upper insert having an assembly hole extending in a top-bottom direction, the assembly hole allowing the insulator to be fitted to a transmission; a lower insert having a fastening member for fitting to a cross member; and a molded single bridge connected integrally to the upper insert and to the lower insert. An angle between a centerline of the assembly hole of the upper insert and a bonding surface of the lower insert bonded to the single bridge is greater than an angle between the centerline of the assembly hole of the upper insert and a fastening surface of the lower insert in close contact with a first close contact surface of the cross member.

The bonding surface of the lower insert bonded to a bottom portion of the single bridge may include a pair of first downward slope surfaces inclined downward at predetermined slopes from front and rear end portions of the bonding surface of the lower insert to a center of the bonding surface of the lower insert so as to have a recess shape having a V-shaped cross-section for locking the single bridge.

In addition, the bonding surface of the upper insert bonded to a top portion of the single bridge may include a pair of second downward slope surfaces inclined downward at predetermined slopes from front and rear end portions of the bonding surface of the upper insert to a center of the bonding surface of the upper insert so as to have a wedge shape having a V-shaped cross-section for locking the single bridge.

In addition, the insulator may further include a first rib protruding downward from a front-rear directional intermediate portion of the bonding surface of the upper insert bonded to a top portion of the single bridge so as to be inserted into and fastened to an inside of the single bridge.

In addition, the insulator may further include second ribs protruding upward from front and rear end portions of the bonding surface of the upper insert bonded to a bottom portion of the single bridge so as to lock the bottom portion of the single bridge.

According to another embodiment of the present disclosure, when the assembly recess of the cross member into which the lower insert of the insulator is inserted has a limited space, the lower insert may be configured such that a front-rear width thereof is reduced to allow the lower insert to be inserted into the space of the assembly hole and the upper insert may be configured such that a front-rear width thereof is increased to be greater than the front-rear width of the lower insert.

When the upper insert is configured such that the front-rear width thereof is increased to be greater than the front-rear width of the lower insert, the second ribs may be integral on front and rear end portions of the bonding surface of the upper insert to protrude downward so as to lock a top portion of the single bridge.

According to another embodiment of the present disclosure, the insulator mounted on the cross member may include a right insulator and a left insulator, and reinforcing ribs at opposite angles to each other are integral on the upper insert and the lower insert of each of the right and left insulators.

The right insulator may include a first reinforcing rib protruding downward from a front end portion of the upper insert and a second reinforcing rib protruding downward from a rear end portion of the lower insert. The left insulator may include a first reinforcing rib protruding downward from a rear end portion of the upper insert and a second reinforcing rib protruding downward from a front end portion of the lower insert.

Accordingly, in rearward movement of the transmission, when the upper insert and the first reinforcing rib of each of the right insulator and the left insulator connected to the transmission move rearward in a position in which the lower insert of each of the right insulator and the left insulator is fixedly fitted to the cross member, the single bridge of the left insulator may be stretched and, at the same time, the single bridge of the right insulator may be compressed.

In contrast, in forward movement of the transmission, when the upper insert and the first reinforcing rib of each of the right insulator and the left insulator connected to the transmission move forward in a position in which the lower insert of each of the right insulator and the left insulator is fixedly fitted to the cross member, the single bridge of the right insulator may be stretched and, at the same time, the single bridge of the left insulator may be compressed.

The first reinforcing rib and the second reinforcing rib may have slopes spreading outward at predetermined angles.

The first reinforcing rib of the upper insert may be provided to not overlap one end portion of the lower insert corresponding thereto in the top-bottom direction. The second reinforcing rib of the lower insert may be provided to not overlap one end portion of the upper insert in the top-bottom direction.

According to embodiments, the present disclosure provides the following effects.

First, the structure of the upper insert and the lower insert integrated with the single bridge of the main rubber member of the transmission mount may be improved to reduce the static stiffness of the transmission mount in the right-left direction (i.e., the Y direction) compared to that of the related art. Consequently, booming noise caused by the rolling motion of the transmission may be minimized, thereby improving NVH performance and meeting driving performance.

Second, the structure of the upper insert and the lower insert integrated with the single bridge of the main rubber member of the transmission mount may be improved to reinforce the strength of the transmission mount in the front-rear direction (i.e., the X direction) and increase the static stiffness in the top-bottom direction (i.e., the Z direction) to a predetermined level. Consequently, the pitching motion and the vertical bounce behavior of the transmission may be efficiently controlled, thereby improving vibration isolation performance.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

First, a transmission mount of the related art will be described for a better understanding of the present disclosure.

Figure 1:
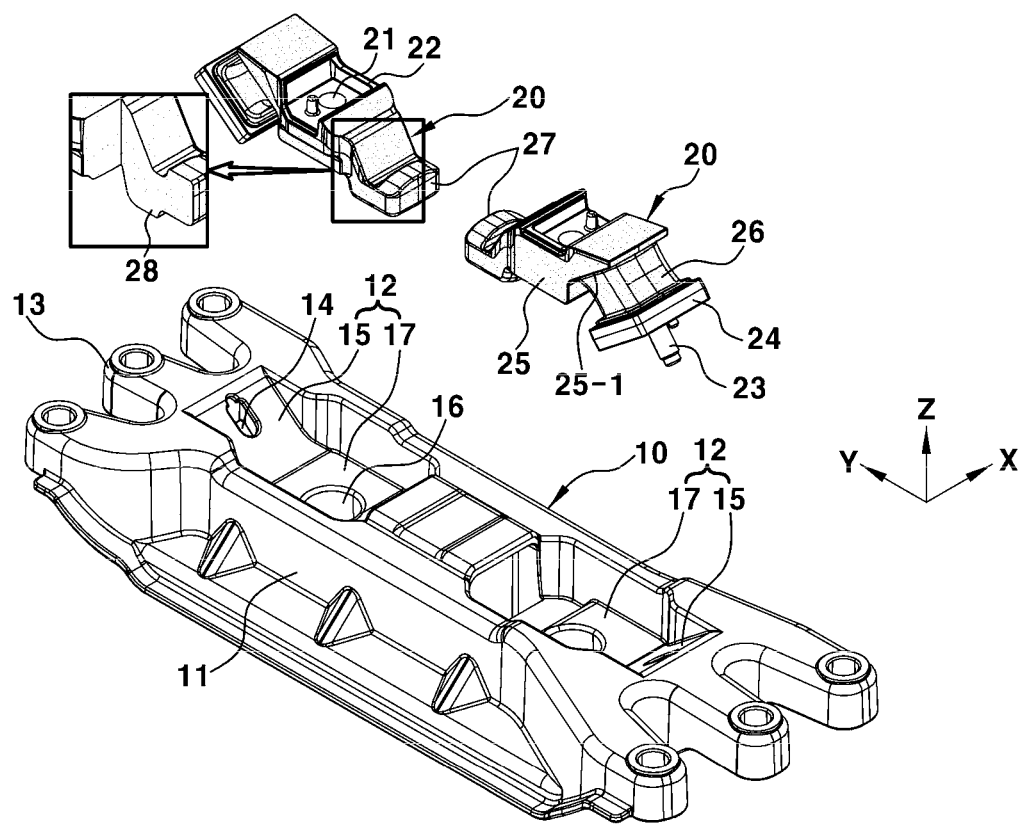
FIG. 1 is an exploded perspective view illustrating a transmission mount of the related art.
Figure 2:
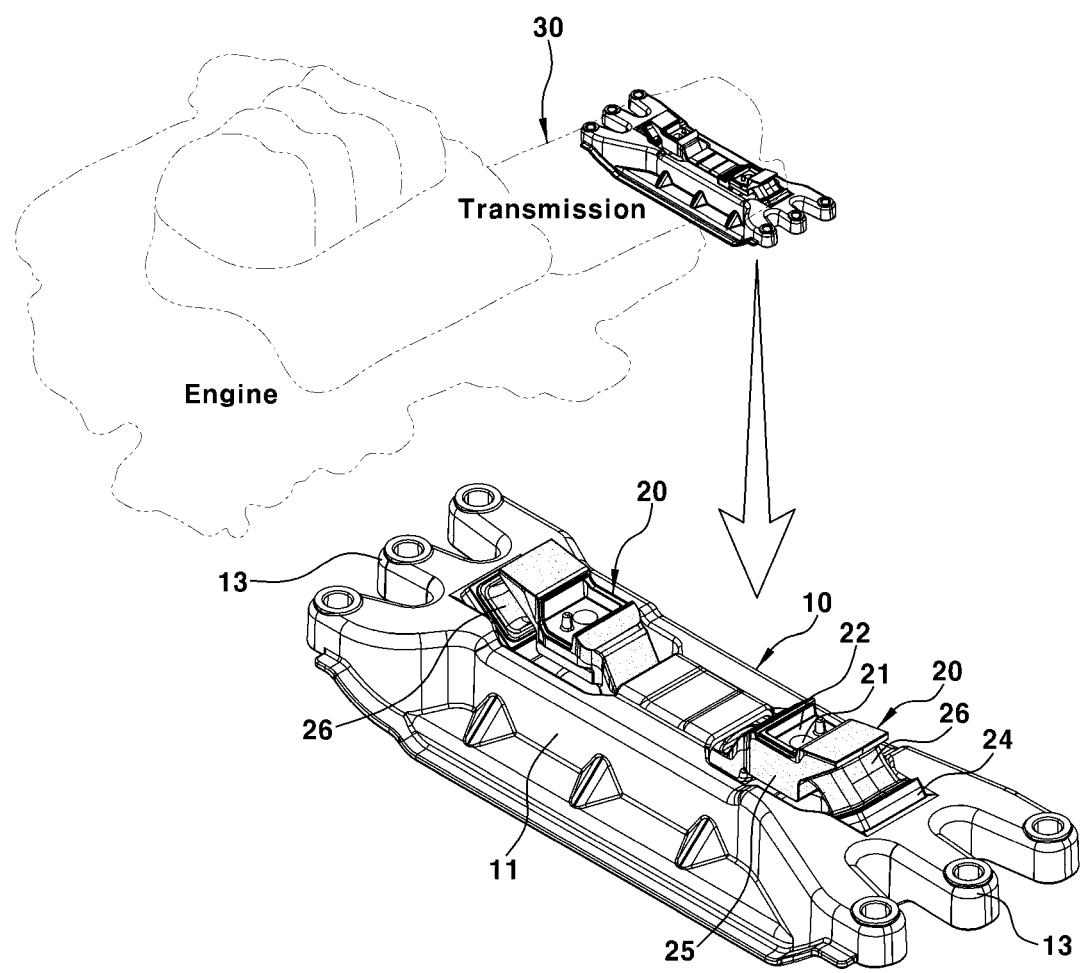
FIG. 2 is an assembled perspective view illustrating the transmission mount of the related art.
Figure 3:
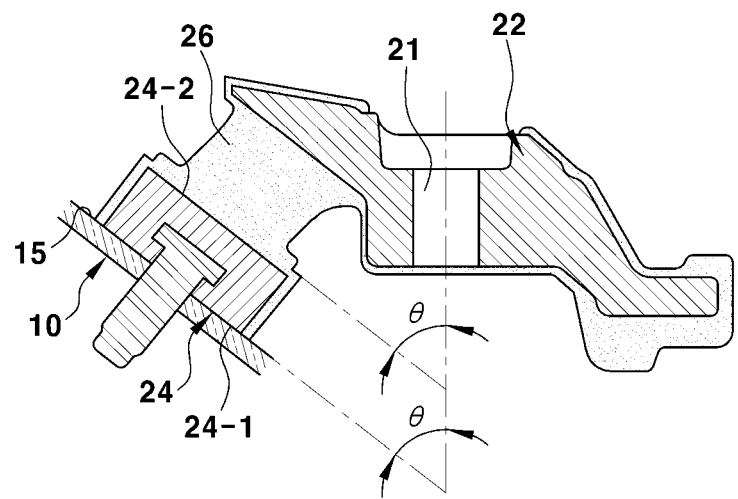
FIG. 3 is a cross-sectional view illustrating the transmission mount of the related art.

FIG. 1 is an exploded perspective view illustrating a transmission mount of the related art, FIG. 2 is an assembled perspective view illustrating the transmission mount of the related art, and FIG. 3 is a cross-sectional view illustrating the transmission mount of the related art.

As illustrated in FIGS. 1 and 2, the transmission mount of the related art includes a cross member 10 mounted on a vehicle body and a pair of insulators 20 mounted on the cross member 10 and supporting the weight of a transmission 30.

The cross member 10 includes a body 11 having assembly recesses 12 and a plurality of assembly legs 13 extending integrally from both ends of the body 11 for fitting to the vehicle body. An oblique first close contact surface 15 having a first mount hole 14 and a horizontal second close contact surface 17 having a second mount hole 16 are formed on the bottom surface of each of the assembly recesses 12.

In particular, each of the insulators 20 of the related art includes: an upper insert 22 having an assembly hole 21 matching the second mount hole 16; a lower insert 24 having a bolt 23 from among a variety of fastening members configured to be inserted into the first mount hole 14; a rubber support 25 placed on the surface of the upper insert 22 and having an outer oblique surface 25-1; a single bridge 26 connected integrally to the oblique surface 25-1 of the rubber support 25 and to the lower insert 24, the single bridge 26 being a molded main rubber member; a stretch-direction stopper 27 molded integrally inside the rubber support 25; a compression-direction stopper 28 molded integrally on the bottom surface of the stretch-direction stopper 27; and the like.

Thus, the insulators 20 are inserted into the assembly recesses 12 of the cross member 10. At the same time, the bolts 23 of the lower inserts 24 are inserted into and fastened to the first mount holes 14 of the first close contact surfaces 15 using nuts or the like. In this manner, the fitting of the insulators 20 to the cross member 10 is completed.

In addition, the bolts (not shown) are inserted through the assembly holes 21 of the upper inserts 22 and the second mount holes 16 of the second close contact surfaces 17 so as to be fastened to tabs or the like formed on the transmission or the transfer. In this manner, the transmission 30 or the transfer is supported by the insulators 20.

For reference, the upper insert 22 may be provided as a structure without the assembly holes 21. In this case, stud bolts may be fitted to the upper insert 22 by molding.

Here, the lower insert 24 has a constant thickness as illustrated in FIG. 3. The bottom surface of the lower insert 24 is a fastening surface 24-1 in close contact with the first close contact surface 15 of the cross member 10. The top surface of the lower insert 24 is a bonding surface 24-2 bonded integrally with the single bridge 26.

As the lower insert 24 has a constant thickness as described above, the fastening surface 24-1 of the lower insert 24 in close contact with the first close contact surface 15 and the bonding surface 24-2 of the lower insert 24 bonded integrally with the single bridge 26 are parallel to each other.

Thus, as illustrated in FIG. 3, the angle θ between the center of the assembly hole 21 of the upper insert 22 and the fastening surface 24-1 and the angle θ between the center of the assembly hole 21 of the upper insert 22 and the bonding surface 24-2 are the same.

Thus, the single bridge 26, i.e., the main rubber member, is a transverse bridge of a rectangular cross-section elongated in the front-rear direction of the vehicle. In a position in which the single bridge 26 is supported on the lower insert 24 having the fastening surface 24-1 and the bonding surface 24-2 parallel to each other, the single bridge 26 serves to damp the rolling motion or the pitching motion of the transmission 30 or both the rolling motion and the pitching motion of the transmission 30.

However, compared to when the rolling motion or the pitching motion of the transmission 30 occurs, when both the rolling motion and the pitching motion of the transmission 30 occur, the single bridge 26 of the insulator 20 is compressed in the downward direction of the top-bottom direction (i.e., the Z direction) and is hardened with the compressed volume thereof being increased. Consequently, the static stiffness in the right-left direction (i.e., the Y direction) referring to force per unit length applied to the single bridge 26 of the insulator is increased, thereby deteriorating booming noise caused by the rolling motion of the transmission.

The present disclosure is intended to overcome the related-art problem as described above. The present disclosure provides a transmission mount for a vehicle, in which the structure of the upper insert and the lower insert integrated with the single bridge among the components of the transmission mount may be improved to reduce the static stiffness in the right-left direction (i.e., the Y direction) of the transmission mount. The strength of the transmission mount in the front-rear direction (i.e., the X direction) and the static stiffness in the top-bottom direction (i.e., the Z direction) may be reinforced so that the pitching motion and the vertical bounce behavior of the transmission may be efficiently controlled. Accordingly, it is possible to minimize booming noise caused by the rolling motion of the transmission, thereby improving NVH performance, and thus, meeting driving performance.

Hereinafter, exemplary embodiments of the present disclosure will be described in detail with reference to the accompanying drawings.

First Embodiment

Figure 4A:
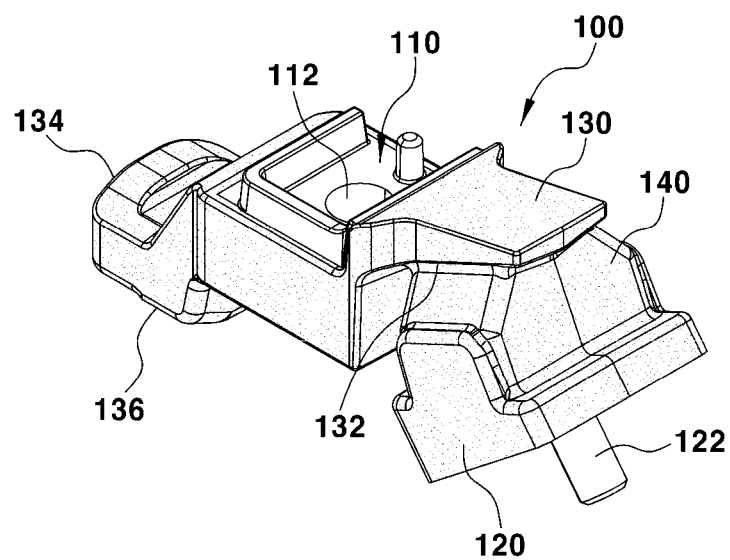
FIGS. 4A and 4B are perspective views illustrating an insulator of a transmission mount according to a first embodiment of the present disclosure.
Figure 4B:
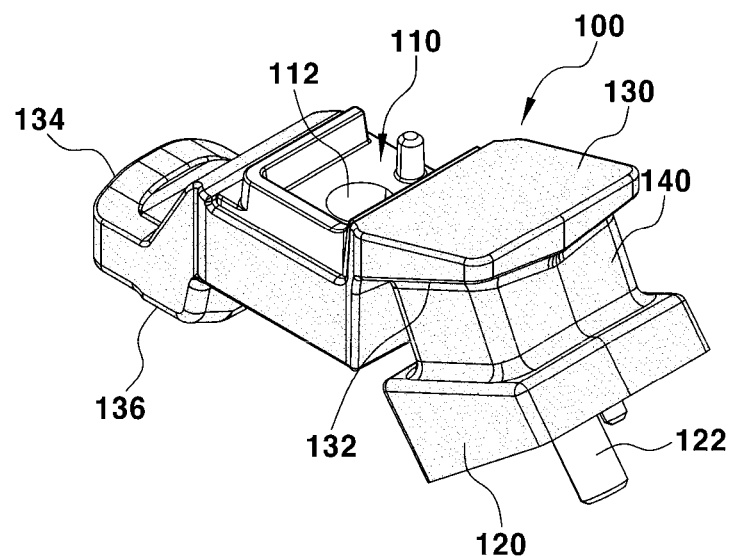
Figure 5A:
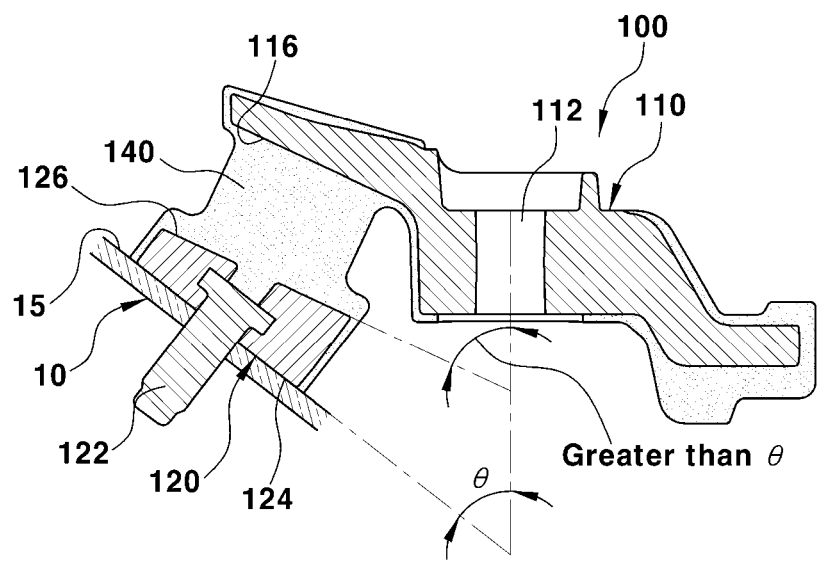
FIGS. 5A to 5C are sectional views illustrating the insulator of a transmission mount according to the first embodiment of the present disclosure.
Figure 5B:
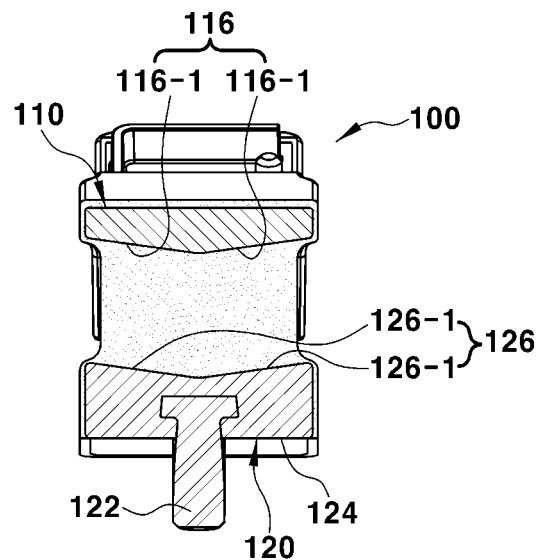
Figure 5C:
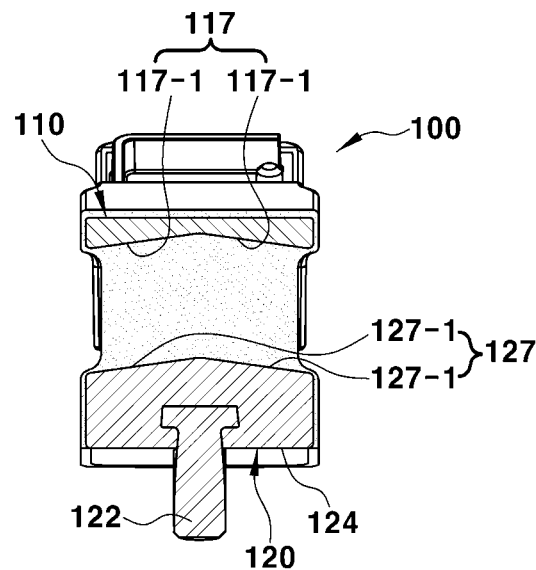

FIGS. 4A and 4B are perspective views illustrating an insulator 100 of a transmission mount according to a first embodiment of the present disclosure, and FIGS. 5A to 5C are longitudinal cross-sectional views illustrating the insulator of the transmission mount 100 according to the first embodiment of the present disclosure.

The insulator 100 of a transmission mount according to the first embodiment of the present disclosure includes: an upper insert 110 having an assembly hole 112 extending in the top-bottom direction, the assembly hole 112 allowing the insulator 100 to be fitted to a transmission; a lower insert 120 having a bolt 122 fastened to the front surface thereof, the bolt 122 allowing the insulator 100 to be fitted to a cross member; a rubber support 130 placed on the surface of the upper insert 110 and having an outer oblique surface 132; a single bridge 140 connected integrally to the oblique surface 132 of the rubber support 130 and to the lower insert 120, the single bridge 140 being a molded main rubber member; a stretch-direction stopper 134 molded integrally inside the rubber support 130; a compression-direction stopper 136 molded integrally on the bottom surface of the stretch-direction stopper 134; and the like.

Referring to FIG. 5A, the bottom surface of the lower insert 120 is a fastening surface 124 in close contact with the first close contact surface 15 of the cross member 10. The top surface of the lower insert 120 is a bonding surface 126 bonded integrally with the single bridge 140.

Thus, in a position in which the single bridge 140 is connected to the upper insert 110 and the lower insert 120, the single bridge 140 serves to damp the rolling motion or the pitching motion of the transmission 30 or both the rolling motion and the pitching motion of the transmission 30.

Particularly, as apparent from FIG. 5A, the lower insert 120 is configured such that the thickness thereof gradually increases from the outer end to the inner end.

More particularly, the slope of the bonding surface 126 of the lower insert 120 is determined to be gentler than the slope of the fastening surface 124 of the lower insert 120, such that the thickness of the lower insert 120 gradually increases from the outer end to the inner end. In one example, the thickness of the lower insert 120 may linearly increase from the outer end to the inner end.

Thus, as illustrated in FIG. 5A, the angle between the center of the assembly hole 112 of the upper insert 110 and the bonding surface 126 of the lower insert 120 is greater than the angle between the center of the assembly hole 112 of the upper insert 110 and the fastening surface 124 of the lower insert 120.

In the insulator 20 of the related art, as described above with reference to FIG. 3, the angle between the center of the assembly hole 21 of the upper insert 22 and the fastening surface 24-1 and the angle between the center of the assembly hole 21 of the upper insert 22 and the bonding surface 24-2 are the same. Thus, when both the rolling motion and the pitching motion of the transmission 30 occur, the single bridge 26 of the insulator 20 is compressed in the downward direction of the top-bottom direction (i.e., the Z direction) and is hardened with the compressed volume thereof being increased. Consequently, the static stiffness in the right-left direction (i.e., the Y direction) referring to force per unit length applied to the single bridge 26 of the insulator is increased, thereby deteriorating booming noise caused by the rolling motion of the transmission.

In contrast, in the insulator 100 of a transmission mount according to the first embodiment of the present disclosure, the angle between the center of the assembly hole 112 of the upper insert 110 and the bonding surface 126 of the lower insert 120 is greater than the angle between the center of the assembly hole 112 of the upper insert 110 and the fastening surface 124 of the lower insert 120. When the rolling motion of the transmission or both the rolling motion and the pitching motion of the transmission occur, the single bridge 140 is compressed in the downward direction of the top-bottom direction (i.e., the Z direction) while the compressed volume thereof is reduced. Consequently, the static stiffness N/mm in the right-left direction (i.e., the Y direction) force per unit length applied to the single bridge 140 of the insulator may be reduced compared to those of the related art. Accordingly, it is possible to minimize booming noise caused by the rolling motion of the transmission, thereby improving NVH performance, and thus, meeting driving performance.

In addition, in a situation in which the single bridge 140 of the insulator 100 alone is located between and connected to the upper insert 110 and the lower insert 120, the single bridge 140 damps the rolling motion or the pitching motion of the transmission 30 or both the rolling motion and the pitching motion of the transmission 30. Thus, it is necessary to reinforce the strength in the front-rear direction (i.e., the X direction) while reducing the static stiffness, i.e., the strength in the right-left direction (i.e., the Y direction), compared to the related art.

In this regard, in order to reinforce the front-rear directional (i.e., the X directional) strength of the insulator 100 of a transmission mount according to the first embodiment of the present disclosure, as illustrated in FIG. 5B, the bonding surface 126 of the lower insert 120 bonded to the bottom portion of the single bridge 140 includes a pair of first downward slope surfaces 126-1 inclined downward at predetermined angles in directions from the front and rear ends to the center.

In addition, in order to reinforce the front-rear directional (i.e., X directional) strength of the insulator 100 of a transmission mount according to the first embodiment of the present disclosure, as illustrated in FIG. 5B, a bonding surface 116 of the upper insert 110 bonded to the top portion of the single bridge 140 includes a pair of second downward slope surfaces 116-1 inclined downward at predetermined angles in directions from the front and rear ends to the center.

Thus, the bonding surface 126 of the lower insert 120 has the shape of a recess having a V-shaped cross-section due to the pair of first downward slope surfaces 126-1 to serve to lock the single bridge 140 bonded to the bonding surface 126. The bonding surface 116 of the upper insert 110 also has the shape of a wedge having a V-shaped cross-section due to the pair of second downward slope surfaces 116-1 to serve to lock the single bridge 140 bonded to the bonding surface 116. Consequently, the front-rear directional (i.e., X directional) strength of the single bridge 140 may be reinforced, thereby reinforcing the front-rear directional (i.e., X directional) strength of the insulator 100.

Alternatively, as illustrated in FIG. 5C, a bonding surface 127 of the lower insert 120 bonded to the bottom portion of a single bridge 140 may include a pair of first upward slope surfaces 127-1 inclined upward at predetermined angles in directions from the front and rear ends to the center, thereby having the shape of a wedge having a A-shaped cross-section to lock the single bridge 140. A bonding surface 117 of the lower insert 120 bonded to the top portion of the single bridge 140 may include a pair of first upward slope surfaces 117-1 inclined upward at predetermined angles in directions from the front and rear ends to the center, thereby having the shape of a recess having a A-shaped cross-section to lock the single bridge 140. In the same manner, the front-rear directional (i.e., X directional) strength of the single bridge 140 may be reinforced, thereby reinforcing the front-rear directional (i.e., X directional) strength of the insulator 100.

Figure 6A:
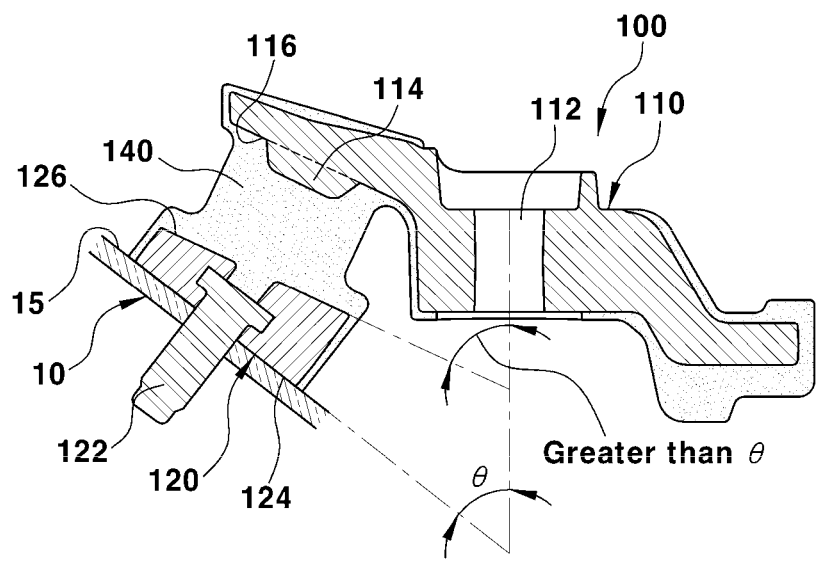
FIG. 6A is a cross-sectional view illustrating the insulator of the transmission mount according to the first embodiment of the present disclosure, in which a first rib is further formed on the upper insert.
Figure 6B:
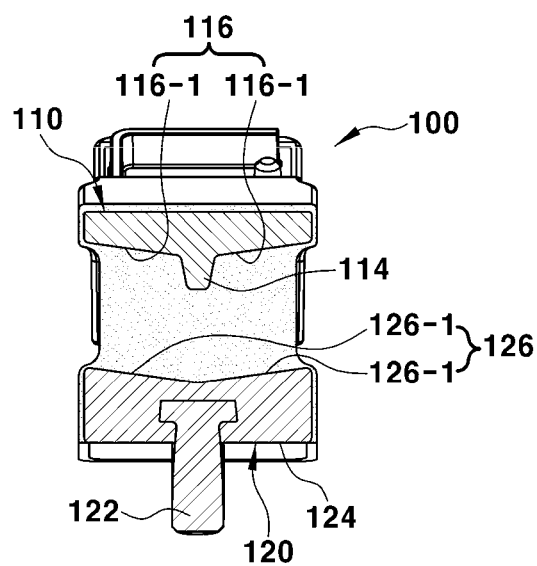
FIG. 6B is a longitudinal cross-sectional view illustrating the insulator of the transmission mount according to the first embodiment of the present disclosure, in which the first rib is further formed on the upper insert.

In addition, in order to further reinforce the front-rear directional (i.e., X directional) strength of the insulator 100, i.e., the front-rear directional (i.e., X directional) strength of the single bridge 140, as illustrated in FIGS. 6A and 6B, the bonding surface 116 of the upper insert 110 bonded to the top portion of the single bridge 140 has a first rib 114 formed integrally on the intermediate portion in the front-rear direction to protrude downward. The first rib 114 is inserted into and fastened to the inside of the single bridge 140.

Thus, in this position, the first rib 114 of the upper insert 110 is coupled to the inside of the single bridge 140. Consequently, the front-rear directional (i.e., X directional) strength of the single bridge 140 may be further reinforced, thereby further reinforcing the front-rear directional (i.e., X directional) strength of the insulator 100.

A test of comparing the static stiffness of the transmission mount according to the first embodiment of the present disclosure with the static stiffness of the above-described transmission mount of the related art was carried out, and the results are illustrated in Table 1 below.

As test conditions and methods, insulators according to the present disclosure and the related having the same hardness (e.g., Hs 50) are were fabricated. The static stiffness was measured by applying the same load to the insulators according to the present disclosure and the related in the right-left direction (i.e., the Y direction), the front-rear direction (i.e., the X direction), and the top-bottom direction (i.e., the Z direction).

TABLE 1

|  | Related Art | | | Present Disclosure | | |
| --- | --- | --- | --- | --- | --- | --- |
|  | X | Y | Z | X | Y | Z |
| Static stiffness (N/mm) | 52 | 218 | 243 | 57 | 108 | 301 |
| Static stiffness Ratio | 0.21 (X/Z) | 0.9 (Y/Z) | 1.0 | 0.19 (X/Z) | 0.36 (Y/Z) | 1.0 |

As illustrated in Table 1 above, it was determined that the right-left directional static stiffness of the insulator according to the present disclosure, i.e., the strength of the insulator in the Y direction expressed in numerical values, was reduced to be smaller than that of the insulator of the related art. In contrast, the front-rear directional static stiffness of the insulator according to the present disclosure, i.e., the strength of the insulator in the X direction expressed in numerical values, remained to be similar to that of the insulator of the related art, and the top-bottom directional static stiffness of the insulator according to the present disclosure, i.e., the strength of the insulator in the Z direction expressed in numerical values, was increased to be greater than that of the insulator of the related art.

Figure 6C:
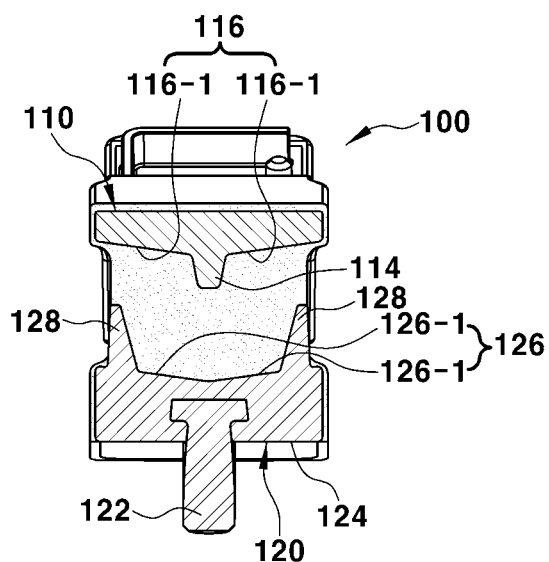
FIG. 6C is a longitudinal cross-sectional view illustrating the insulator of the transmission mount according to the first embodiment of the present disclosure, in which a first rib is further formed on the upper insert and a second rib is further formed on the lower insert.

In addition, in order to further reinforce the front-rear directional (i.e., X directional) strength of the insulator 100, i.e., the front-rear directional (i.e., X directional) strength of the single bridge 140, as illustrated in FIG. 6C, the bonding surface 126 of the lower insert 120 may further have second support ribs 128 formed integrally on the front and rear ends thereof to protrude upward. The bottom end portion of the single bridge 140 is locked between the second support ribs 128. Consequently, the front-rear directional (i.e., X directional) strength of the single bridge 140 may be further reinforced, thereby further reinforcing the front-rear directional (i.e., X directional) strength of the insulator 100.

For reference, the insulator 100 of a transmission mount according to the first embodiment of the present disclosure may have the outer shape as illustrated in FIG. 4A or the outer shape as illustrated in FIG. 4B.

As described above, it is possible to reduce the right-left directional (i.e., Y directional) static stiffness of the transmission mount according to the first embodiment of the present disclosure to be lower than that of the related art, increase the top-bottom directional (i.e., Z directional) static stiffness of the transmission mount to be greater than that of the related art, and reinforce the front-rear directional (i.e., X directional) static stiffness of the transmission mount so as to minimize booming noise caused by the rolling motion of the transmission, thereby improving NVH performance, and thus, meeting driving performance.

Second Embodiment

Figure 7:
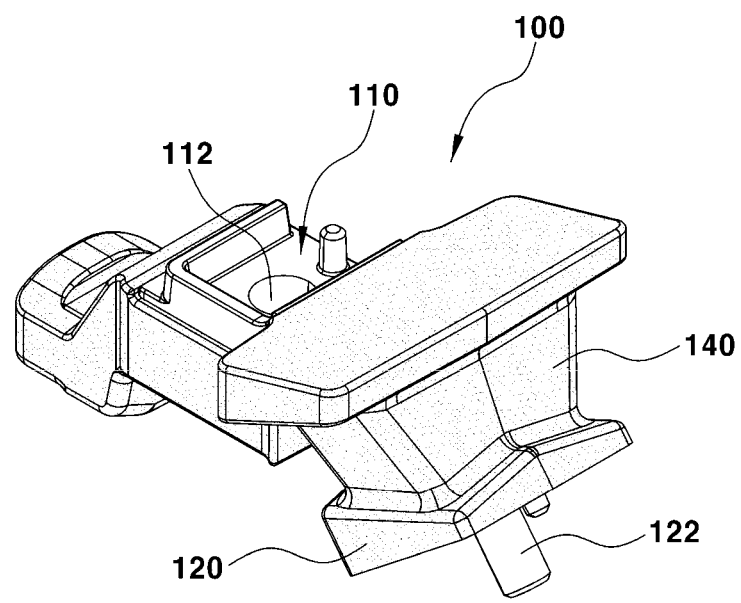
FIG. 7 is a perspective view illustrating an insulator of a transmission mount according to a second embodiment of the present disclosure.
Figure 8:
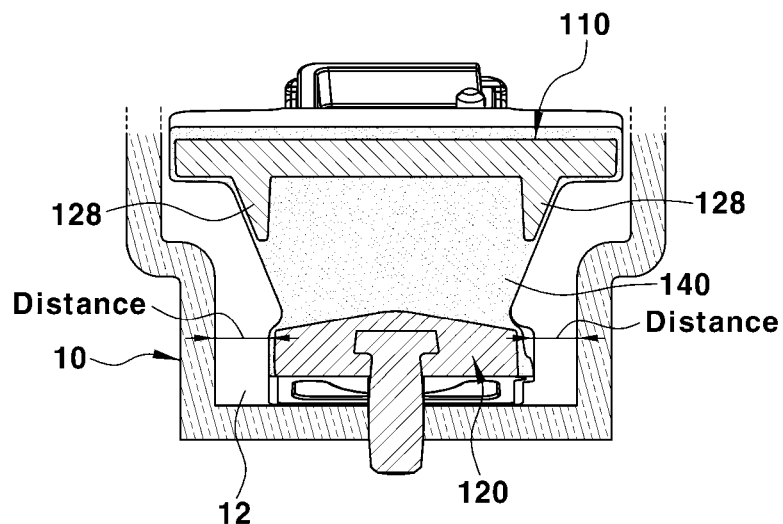
FIG. 8 is a longitudinal cross-sectional view illustrating the insulator of a transmission mount according to the second embodiment of the present disclosure.

FIG. 7 is a perspective view illustrating an insulator of a transmission mount according to a second embodiment of the present disclosure, and FIG. 8 is a longitudinal cross-sectional view illustrating the insulator of a transmission mount according to the second embodiment of the present disclosure.

The second embodiment of the present disclosure is configured to be substantially the same as the above-described first embodiment, except that, when the space of the assembly recess 12 of the cross member 30 into which the lower insert 120 of the insulator 100 of the transmission mount is inserted is limited, the lower insert 120 is configured such that the front-rear width thereof is reduced and the upper insert 110 is configured such that the front-rear width thereof is increased to be greater than the front-rear width of the lower insert 120.

That is, in a situation in which the lower insert 120 is inserted into the assembly recess 12 of the cross member 30, when the clearances between the front and rear surfaces of the lower insert 120 and the inner wall of the assembly recess 12 are smaller than reference values, the packaging assemblability of a product may be reduced. Thus, the lower insert 120 is configured such that the front-rear width thereof is reduced. The upper insert 110 may be located outside the assembly recess 12 so as to be free from limitations of packaging, thereby using a structure having an increased front-rear width.

In this case, in order to further reinforce the front-rear directional (i.e., X directional) strength of the insulator 100, i.e., the front-rear directional (i.e., X directional) strength of the single bridge 140, the second support ribs 128 provided in the above-described first embodiment may be formed integrally on the front and rear end portions of the bonding surface 116 of the upper insert 110 having the increased front-rear width so as to protrude downward, instead of being formed on the lower insert 120.

Thus, the second support ribs 128 are formed on the front and rear end portions of the bonding surface 116 of the upper insert 110, i.e., on both sides of the top portion of the single bridge 140, to protrude downward, such that the top portion of the single bridge 140 is locked. Consequently, the front-rear directional (i.e., X directional) strength of the single bridge 140 may be further reinforced.

Third Embodiment

Figure 9:
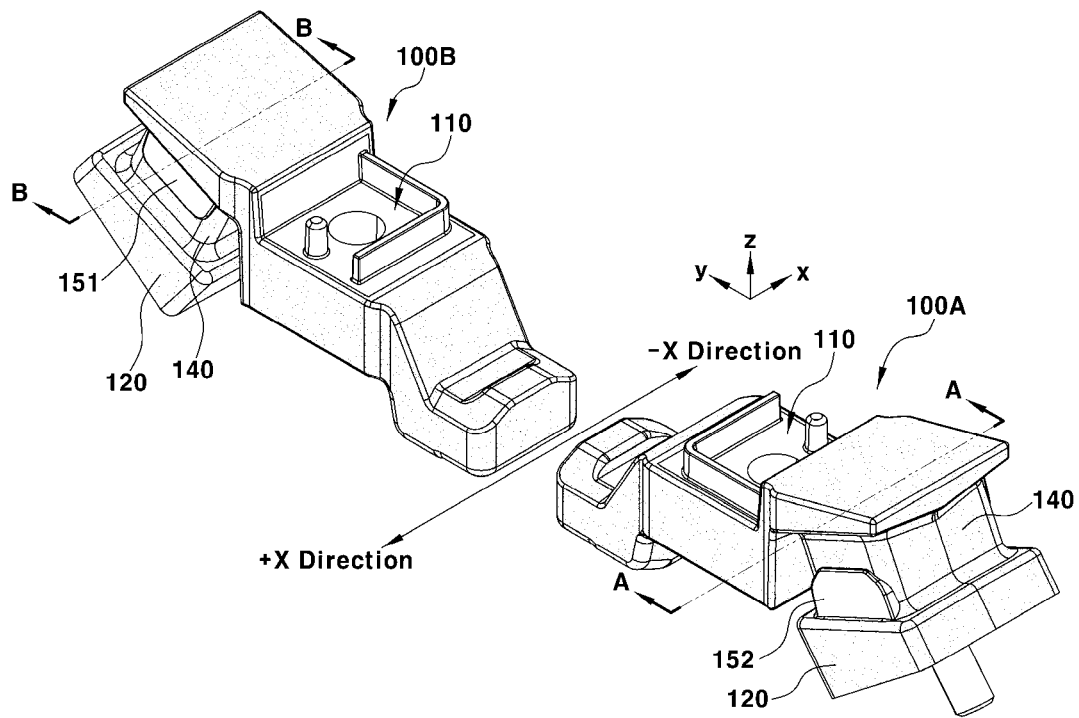
FIG. 9 is a perspective view illustrating an insulator of a transmission mount according to a third embodiment of the present disclosure.
Figure 10:
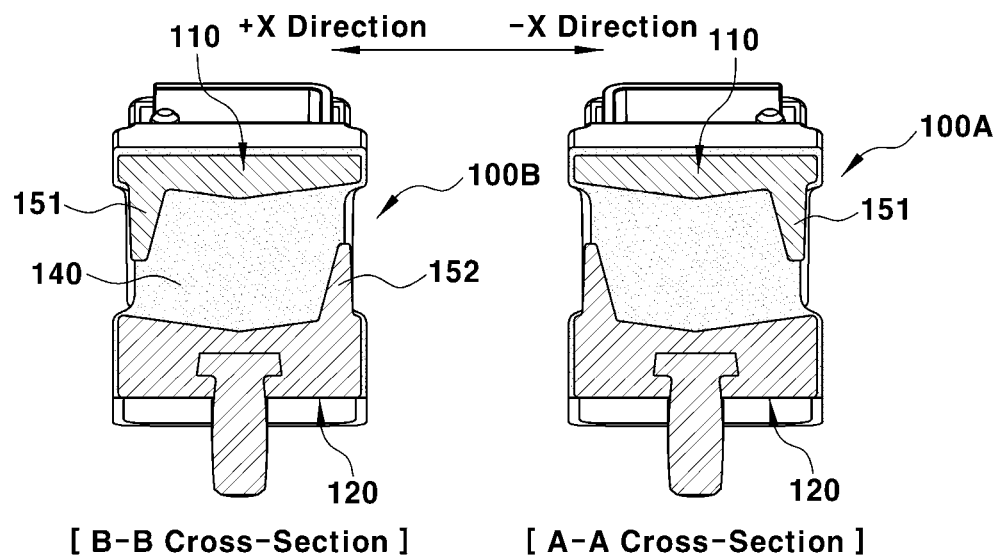
FIG. 10 is a longitudinal cross-sectional view illustrating the insulator of a transmission mount according to the third embodiment of the present disclosure.

FIG. 9 is a perspective view illustrating an insulator of a transmission mount according to a third embodiment of the present disclosure, and FIG. 10 is a longitudinal cross-sectional view illustrating the insulator of a transmission mount according to the third embodiment of the present disclosure.

As described above, the third embodiment of the present disclosure has been made keeping in mind that the insulators mounted on the cross member of the transmission mount consist of a pair of insulators, such as a right (RH) insulator 100A and a left insulator (LH) 100B, and is characterized in that reinforcing ribs at opposite angles to each other are formed integrally on the upper insert and the lower insert of each of the right and left insulators 100A and 100B.

More specifically, the right and left insulators 100A and 100B are fabricated as single-type insulators having the same structure. When the right insulator 100A is rotated 180° with respect to the left insulator 100B or the left insulator 100B is rotated 180° with respect to the right insulator 100A, the reinforcing ribs of the right insulator 100A and the left insulator 100B may be arranged asymmetrically while being at opposite angles to each other in the front-rear direction of the vehicle.

Accordingly, the right and left insulators 100A and 100B may be fabricated as single-type insulators having the same structure instead of being fabricated separately, thereby reducing costs.

Referring to FIGS. 9 and 10, in the right (RH) insulator 100A, a first reinforcing rib 151 protrudes downward from the front end portion of the upper insert 110, and a second reinforcing rib 152 protrudes downward from the rear end portion of the lower insert 120. In contrast, in the left (LH) insulator 100B, a first reinforcing rib 151 protrudes downward from the rear end portion of the upper insert 110, and a second reinforcing rib 152 protrudes downward from the front end portion of the lower insert 120.

Here, when the transmission moves in the rearward direction (i.e., the +X direction), in a position in which the lower insert 120 of each of the right insulator 100A and the left insulator 100B is fixedly fitted to the cross member, the upper insert 110 and the first reinforcing rib 151 of each of the right insulator 100A and the left insulator 100B connected to the transmission move in the rearward direction (i.e., the +X direction) indicated in FIG. 10.

Thus, as the first reinforcing rib 151 formed on the rear end portion of the upper insert 110 of the left insulator 100B moves in the rearward direction (i.e., the +X direction), the single bridge 140 of the left insulator 100B is stretched, but the first reinforcing rib 151 formed on the front end portion of the upper insert 110 of the right insulator 100A compresses the single bridge 140 of the right insulator 100A while moving in the rearward direction (i.e., the +X direction). Consequently, the single bridge 140, i.e., the main rubber member of the right insulator 100A, may be compressed to increase the strength of the transmission mount in the rearward direction (i.e., the +X direction) among the front and rear directions.

In contrast, when the transmission moves in the forward direction (i.e., the −X direction), in a position in which the lower insert 120 of each of the right insulator 100A and the left insulator 100B is fixedly fitted to the cross member, the upper insert 110 and the first reinforcing rib 151 of each of the right insulator 100A and the left insulator 100B connected to the transmission move in the forward direction (i.e., the −X direction) indicated in FIG. 10.

Thus, as the first reinforcing rib 151 formed on the front end portion of the upper insert 110 of the right insulator 100A moves in the forward direction (i.e., the −X direction), the single bridge 140 of the left insulator 100B is stretched, but the first reinforcing rib 151 formed on the rear end portion of the upper insert 110 of the left insulator 100B compresses the single bridge 140 of the left insulator 100B while moving in the forward direction (i.e., the −X direction). Consequently, the single bridge 140, i.e., the main rubber member of the left insulator 100B, may be compressed to increase the strength of the transmission mount in the forward direction (i.e., the −X direction) among the front and rear directions.

As described above, considering that the insulators mounted on the cross member of the transmission mount are provided as a pair of insulators, such as the right and left insulators, the strength of the transmission mount in the rearward direction (i.e., the +X direction) among the front and rear directions may be increased as the single bridge 140, i.e., the main rubber member, of the right insulator 100A is compressed. In addition, the strength of the transmission mount in the forward direction (i.e., the −X direction) among the front and rear directions may be increased as the single bridge 140, i.e., the main rubber member, of the left insulator 100B is compressed. Consequently, the strength of the transmission mount may be easily increased in both the front and rear directions.

In addition, the right (RH) insulator 100A may have the first reinforcing rib 151 protruding downward from the rear end portion of the upper insert 110 and the second reinforcing rib 152 protruding upward from the front end portion of the lower insert 120 and the left (LH) insulator 100B may have the first reinforcing rib 151 protruding downward from the front end portion of the upper insert 110 and the second reinforcing rib 152 protruding upward from the rear end portion of the lower insert 120, such that an effect of easily increasing the strength of the transmission mount in both the front and rear directions may be obtained.

Thus, in the rearward movement of the transmission, when the upper insert 110 and the first reinforcing rib 151 of each of the right insulator 100A and the left insulator 100B connected to the transmission moves rearward in a position in which the lower insert 120 of each of the right insulator 100A and the left insulator 100B is fixedly fitted to the cross member, the single bridge of the left insulator 100B may be compressed and, at the same time, the single bridge 140 of the right insulator 100A may be stretched.

In contrast, in the forward movement of the transmission, when the upper insert 110 and the first reinforcing rib 151 of each of the right insulator 100A and the left insulator 100B connected to the transmission moves forward in a position in which the lower insert 120 of each of the right insulator 100A and the left insulator 100B is fixedly fitted to the cross member, the single bridge 140 of the right insulator 100A may be compressed and, at the same time, the single bridge of the left insulator 100B may be stretched.

When the single bridge 140 is hardened due to excessive increases in the amount of compression of the single bridge 140 in the top-bottom direction (i.e., the Z direction), the strength of the insulator in the top-bottom direction (i.e., the Z direction) may be excessively increased. Thus, a method of reducing the excessive increase in the strength is required.

Figure 11:
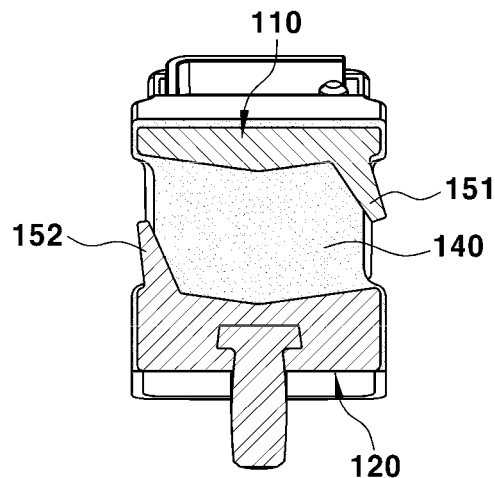
FIG. 11 is a longitudinal cross-sectional view illustrating the insulator of a transmission mount according to the third embodiment of the present disclosure in which the first reinforcing rib and the second reinforcing rib of the insulator have slopes spreading outward.

In this regard, it is possible to improve the slope structure of the first and second reinforcing ribs 151 and 152 of the insulator according to the third embodiment of the present disclosure to have the structure as illustrated in FIG. 11 in order to reduce excessive increase in the strength of the insulator in the top-bottom direction (i.e., the Z direction).

More specifically, since the first reinforcing rib 151 formed on the upper insert 110 and the second reinforcing rib 152 formed on the lower insert 120 have slopes spreading outward at predetermined angles, the degree to which the first reinforcing rib 151 and the second reinforcing rib 152 compress the single bridge 140 when the single bridge 140, i.e., the main rubber member, is compressed in the top-bottom direction (i.e., the Z direction) may be reduced. Consequently, the amount of compression of the single bridge 140 in the top-bottom direction (i.e., the Z direction) may be reduced, thereby easily reducing the excessive increase in the strength of the insulator in the top-bottom direction (i.e., the Z direction).

Figure 12:
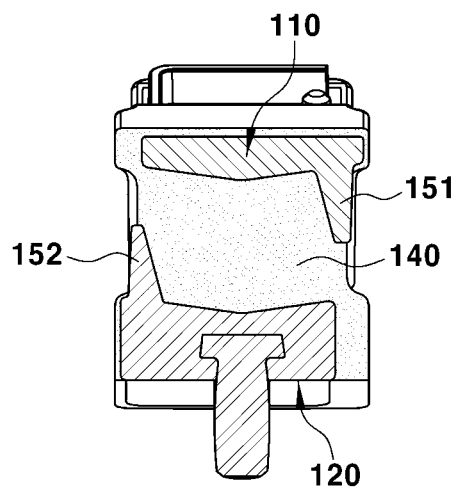
FIG. 12 is a longitudinal cross-sectional view illustrating the insulator of a transmission mount according to the third embodiment of the present disclosure in which an overlapping area between the upper insert and the lower insert of the insulator is reduced.

Alternatively, the structure as illustrated in FIG. 12 may be used as a structure of reducing the overlapping area between the upper insert 110 and the lower insert 120 of the insulator according to the third embodiment of the present disclosure, thereby reducing the excessive increase in the strength of the insulator in the top-bottom direction (i.e., the Z direction).

In this regard, the first reinforcing rib 151 of the upper insert 110 is formed to not overlap one end portion of the lower insert 120 in the top-bottom direction, and the second reinforcing rib 152 of the lower insert 120 is formed to not overlap one end portion of the upper insert 110 in the top-bottom direction.

More specifically, the lower insert 120 may have a structure with a reduced front-back width by removing one end portion of the lower insert 120 facing and overlapping the first reinforcing rib 151 of the upper insert 110 and the upper insert 110 may have a structure with a reduced front-back width by removing one end portion of the upper insert 110 facing and overlapping the second reinforcing rib 152 of the upper insert 110. Thus, the first reinforcing rib 151 of the upper insert 110 does not overlap one end portion of the lower insert 120 in the top-bottom direction, and the second reinforcing rib 152 of the lower insert 120 does not overlap one end portion of the upper insert 110 in the top-bottom direction.

Accordingly, when the single bridge 140 is compressed in the top-bottom direction (i.e., the Z direction), the degree to which the first reinforcing rib 151 and the second reinforcing rib 152 compress the single bridge 140 may be reduced. Consequently, the amount of compression of the single bridge 140 in the top-bottom direction (i.e., the Z direction) may be reduced, thereby easily reducing the excessive increase in the strength of the insulator in the top-bottom direction (i.e., the Z direction).

Although the specific embodiments of the present disclosure have been described for illustrative purposes, the scope of right of the present disclosure is not limited to the foregoing specific embodiments. It should be understood that various modifications and improvements made by those skilled in the art using the fundamental principle of the present disclosure belong to the scope of right of the present disclosure as defined in the accompanying claims.

What is claimed is:

1. A transmission mount for a vehicle, the transmission mount comprising an insulator, wherein the insulator comprises:
   an upper insert having an assembly hole extending in a top-bottom direction, the assembly hole allowing the insulator to be fitted to a transmission;
   a lower insert having a fastening member for fitting to a cross member; and
   a molded single bridge integrated between the upper insert and the lower insert,
   wherein a thickness of the lower insert gradually increases from an outer end of the lower insert to an inner end of the lower insert, and an angle between a centerline of the assembly hole of the upper insert and a bonding surface of the lower insert bonded to the single bridge is greater than an angle between the centerline of the assembly hole of the upper insert and a fastening surface of the lower insert in close contact with a first close contact surface of the cross member, and
   wherein a bonding surface of the upper insert comprises a pair of one surfaces inclined at a predetermined angle from front and rear end portions thereof toward a center of the bonding urface of the upper insert.

2. The tranmission mount according to claim 1, wherein the bonding surface of the lower insert bonded to a bottom portion of the single bridge comprises a pair of first downward slope surfaces inclined downward at predetermined slopes from front and rear end portions of the bonding surface of the lower insert to a center of the bonding surface of the lower insert so as to have a recess shape having a V-shaped cross-section for locking the single bridge.

3. The transmission mount according to claim 1, wherein slope surfaces have a wedge shape having a V-shaped cross-section for locking the single bridge.

4. The transmission mount according to claim 1, wherein the insulator further comprises a first rib protruding downward from a front-rear directional intermediate portion of the bonding surface of the upper insert bonded to a top portion of the single bridge so as to be inserted into and fastened to an inside of the single bridge.

5. The transmission mount according to claim 1, wherein the insulator further comprises support ribs protruding upward from front and rear end portions of the bonding surface of the upper insert bonded to a bottom portion of the single bridge so as to lock the bottom portion of the single bridge.

6. A transmission mount for a vehicle, the transmission mount comprising an insulator, wherein the insulator comprises,
   an upper insert having an assembly hole extending in a top-bottom direction, the assembly hole allowing the insulator to be fitted to a transmission;
   a lower insert having a fastening member for fitting to a cross member; and
   a molded single bridge integrated between the upper insert and the lower insert,
   wherein an angle between a centerline of the assembly hole of the upper insert and a bonding surface of the lower insert bonded to the single bridge is greater than an angle between the centerline of the assembly hole of the upper insert and a fastening surface of the lower insert in close contact with first close contact surface of the cross member, and
   wherein the lower insert is configured such that a front-rear width thereof is reduced to allow the lower insert to be inserted into a space of an assembly recesses and the upper insert is configured such that a front-rear width thereof is increased to be greater than the front-rear width of the lower insert.

7. The transmission mount according to claim 6, wherein support ribs are integral on front and rear end portions of the bonding surface of the upper insert to protrude downward so as to lock a top portion of the single bridge.

8. The transmission mount according to claim 1, wherein the bonding surface of the lower insert bonded to a bottom portion of the single bridge comprises a pair of first upward slope surfaces inclined upward at predetermined slopes from front and rear end portions of the bonding surface of the lower insert to a center of the bonding surface of the lower insert so as to have a wedge shape having an uppercase A-shaped cross-section for locking the single bridge.

9. The transmission mount according to claim 1, wherein the bonding surface of the upper insert bonded to a top portion of the single bridge comprises a pair of second upward slope surfaces inclined upward at predetermined slopes from front and rear end portions of the bonding surface of the upper insert to a center of the bonding surface of the upper insert so as to have a recess shape having an uppercase A-shaped cross-section for locking the single bridge.

10. A transmission mount for a vehicle, the transmission mount comprising an insulator, wherein the insulator comprises:
   an upper insert having an assembly hole extending in a top-bottom direction, the assembly hole allowing the insulator to be fitted to a transmission;
   a lower insert having a fastening member for fitting to a cross member; and
   a molded single bridge integrated between the upper insert and the lower insert,
   wherein an angle between a centerline of the assembly hole of the upper insert and a bonding surface of the lower insert bonded to the single bridge is greater than an angle between the centerline of the assembly hole of the upper insert and a fastening surface of the lower insert in close contact with a first close contact surface of the cross member, and wherein the insulator mounted on the cross member comprises a right insulator and a left insulator, and reinforcing ribs at positions diagonal from each other are integral on the upper insert and the lower insert of each of the right and left insulators.

11. The transmission mount according to claim 10, wherein the right insulator and the left insulator are positioned to face each other, and wherein the reinforcing ribs of the right insulator and the left insulator are arranged at positions diagonal to each other.

12. The transmission mount according to claim 10, wherein the right insulator comprises a first reinforcing rib protruding downward from a front end portion of the upper insert and a second reinforcing rib protruding downward from a rear end portion of the lower insert, and the left insulator comprises a first reinforcing rib protruding downward from a rear end portion of the upper insert and a second reinforcing rib protruding downward from a front end portion of the lower insert.

13. The transmission mount according to claim 12, wherein, in rearward movement of the transmission, when the upper insert and the first reinforcing rib of each of the right insulator and the left insulator connected to the transmission move rearward with the lower insert of each of the right insulator and the left insulator fixed to the cross member, the single bridge of the left insulator is stretched and, at the same time, the single bridge of the right insulator is compressed.

14. The transmission mount according to claim 12, wherein, in forward movement of the transmission, when the upper insert and the first reinforcing rib of each of the right insulator and the left insulator connected to the transmission move forward with the lower insert of each of the right insulator and the left insulator fixed to the cross member, the single bridge of the right insulator is stretched and, at the same time, the single bridge of the left insulator is compressed.

15. The transmission mount according to claim 12, wherein the first reinforcing rib and the second reinforcing rib have slopes spreading outward at predetermined angles.

16. The transmission mount according to claim 12, wherein the first reinforcing rib of the upper insert is provided to not overlap one end portion of the lower insert corresponding thereto in the top-bottom direction, and the second reinforcing rib of the lower insert is provided to not overlap one end portion of the upper insert corresponding thereto in the top-bottom direction.

17. The transmission mount according to claim 10, wherein the right insulator comprises a first reinforcing rib protruding downward from a rear end portion of the upper insert and a second reinforcing rib protruding downward from a front end portion of the lower insert, and the left insulator comprises a first reinforcing rib protruding downward from a front end portion of the upper insert and a second reinforcing rib protruding downward from a rear end portion of the lower insert.

18. The transmission mount according to claim 17, wherein, in rearward movement of the transmission, when the upper insert and the first reinforcing rib of each of the right insulator and the left insulator connected to the transmission move rearward with the lower insert of each of the right insulator and the left insulator fixed to the cross member, the single bridge of the left insulator is compressed and, at the same time, the single bridge of the right insulator is stretched.

19. The transmission mount according to claim 17, wherein, in forward movement of the transmission, when the upper insert and the first reinforcing rib of each of the right insulator and the left insulator connected to the transmission move forward with the lower insert of each of the right insulator and the left insulator fixed to the cross member, the single bridge of the right insulator is compressed and, at the same time, the single bridge of the left insulator is stretched.

20. The transmission mount according to claim 10, wherein the left insulator and the right insulator have a same shape.

* * * * *